United States Patent
Knas et al.

(10) Patent No.: US 10,433,237 B1
(45) Date of Patent: Oct. 1, 2019

(54) METHODS AND SYSTEMS FOR BEACON-BASED MANAGEMENT OF SHARED RESOURCES

(71) Applicant: MASSACHUSETTS MUTUAL LIFE INSURANCE COMPANY, Springfield, MA (US)

(72) Inventors: Michal Knas, Monson, MA (US); Jiby John, Suffield, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

(21) Appl. No.: 15/826,385

(22) Filed: Nov. 29, 2017

Related U.S. Application Data

(63) Continuation of application No. 15/372,118, filed on Dec. 7, 2016, now Pat. No. 9,877,266.

(60) Provisional application No. 62/265,777, filed on Dec. 10, 2015.

(51) Int. Cl.
  *H04W 24/00* (2009.01)
  *H04W 40/24* (2009.01)
  *H04W 4/04* (2009.01)
  *H04W 64/00* (2009.01)

(52) U.S. Cl.
  CPC ........... *H04W 40/244* (2013.01); *H04W 4/04* (2013.01); *H04W 64/00* (2013.01)

(58) Field of Classification Search
  CPC ....... H04W 4/02; H04W 64/00; H04W 8/183; H04W 48/18; H04W 36/30; H04W 36/18; H04W 36/12; H04W 36/04; H04W 16/32; H04W 24/00; H04W 28/04; H04W 72/082; H04L 29/08657

USPC ............... 455/412.2, 421–422.1, 432.1–437, 455/456.1–456.3, 41.1, 41.2
See application file for complete search history.

(56) References Cited

U.S. PATENT DOCUMENTS

| | | | |
|---|---|---|---|
| 7,127,260 B1 | 10/2006 | Kim et al. | |
| 8,884,742 B2* | 11/2014 | Gits | G01C 21/206 340/8.1 |
| 8,929,345 B2 | 1/2015 | Golash et al. | |
| 2004/0173689 A1* | 9/2004 | Kim | H02J 13/0075 236/47 |
| 2006/0154644 A1* | 7/2006 | Erskine | H04M 1/72577 455/405 |
| 2008/0102809 A1* | 5/2008 | Beyer | G01C 21/00 455/420 |
| 2010/0125410 A1 | 5/2010 | Hicks | |
| 2013/0003433 A1 | 1/2013 | Hishida et al. | |
| 2014/0062774 A1 | 3/2014 | Hale et al. | |
| 2014/0108084 A1* | 4/2014 | Bargetzi | G06Q 10/1095 705/7.19 |
| 2015/0005011 A1 | 1/2015 | Nehrenz et al. | |

(Continued)

*Primary Examiner* — Dai Phuong
(74) *Attorney, Agent, or Firm* — Eric L. Sophir; Dentons US LLP

(57) ABSTRACT

Embodiments of the present disclosure can be used to monitor, access, and utilize resources available at workspaces effectively using location-aware devices. Methods and systems disclosed herein integrate location signals received from beacons and other indoor positioning systems for better management of shared resources, such as conference rooms, audiovisual equipment, and other equipment, and address dynamic changes to the availability or non-availability of these resources based on data from location-aware devices and beacons.

20 Claims, 3 Drawing Sheets

(56) References Cited

U.S. PATENT DOCUMENTS

| | | | |
|---|---|---|---|
| 2015/0094098 A1* | 4/2015 | Stern | H04W 4/043 |
| | | | 455/456.3 |
| 2015/0330787 A1 | 11/2015 | Cioffi et al. | |
| 2015/0358762 A1* | 12/2015 | Park | G06K 7/10237 |
| | | | 455/41.1 |
| 2016/0057596 A1 | 2/2016 | Thompson et al. | |
| 2016/0094943 A1 | 3/2016 | Cao | |
| 2016/0127871 A1 | 5/2016 | Smith et al. | |
| 2016/0142531 A1 | 5/2016 | Marti et al. | |
| 2016/0142964 A1 | 5/2016 | Todasco et al. | |
| 2016/0174032 A1* | 6/2016 | Xin | G06F 16/9537 |
| | | | 455/456.3 |
| 2016/0192159 A1 | 6/2016 | O'Malley | |
| 2016/0198431 A1 | 7/2016 | Pattabiraman et al. | |
| 2016/0205654 A1 | 7/2016 | Robinson, Jr. | |
| 2018/0109107 A1* | 4/2018 | Mosebrook | H04L 12/2816 |

* cited by examiner

METHODS AND SYSTEMS FOR BEACON-BASED MANAGEMENT OF SHARED RESOURCES

CROSS REFERENCES TO RELATED APPLICATION

This application is a continuation of co-pending U.S. patent application Ser. No. 15/372,118, filed Dec. 7, 2016, entitled "METHODS AND SYSTEMS FOR BEACON-BASED MANAGEMENT OF SHARED RESOURCES," which claims priority to U.S. Provisional Patent Application Ser. No. 62/265,777, filed on Dec. 10, 2015, which are hereby incorporated by reference in their entirety.

FIELD OF DISCLOSURE

The present application relates generally to systems, methods, and other embodiments for managing resources using wireless transmitters.

BACKGROUND

Efficient and effective management of shared resources, such as office rooms, conference rooms, audiovisual equipment, and personnel resources is a complex logistic problem, plagued by several issues, including but not limited to cancellations, double bookings, insufficient resources, over-utilization of certain spaces and technologies, and under-utilization of other spaces and equipment. Dynamic booking, changes to existing reservations, and cancellations are not possible without involving additional personnel or time to search for available conference rooms, or appropriate equipment, or other resources like drink and food services.

Beacons are small, battery-friendly devices that send out low-voltage signals, such as Bluetooth Low-Energy (BLE), for a programmable distance between about a few cm to 40-50 m. In addition, some smartphones can act as beacons. The frequency of sending the signal can also be programmable; for example, a signal can be sent every 100-400 milliseconds. Beacons can be placed strategically indoors or outdoors to perform many actions. There is a need to integrate the beacon technology and other indoor positioning systems for better management of shared resources and address dynamic changes to the availability or non-availability of resources based on data from user-devices and beacons.

SUMMARY

The systems and methods disclosed herein attempt to address the above-mentioned shortcomings in the art and provide a variety of other benefits. The systems and methods described herein can create, maintain, transmit, and utilize data from user devices and beacons in order to solve the aforementioned problem by allowing one or a plurality of beacons to transmit information at different ranges to provide more granular location information.

In an embodiment, a method comprises receiving, by a server, from a location-aware device a request to identify a plurality of resources. The method comprises receiving, by the server, a device identifier and location signals from the location-aware device, the location signals being associated to a current location associated with the location-aware device and received from a plurality of beacons. The method comprises determining, by the server, the current location associated with the location-aware device based at least on one of the location signals and the device identifier. The method comprises querying, by the server, a database to identify the plurality of resources responsive to the request and corresponding to the current location associated with the location-aware device, wherein the database is configured to store one or more records of the plurality of resources and one or more records of a plurality of location-aware devices. The method comprises generating, by the server, a notification configured to display the plurality of resources responsive to the request. The method further comprises transmitting, by the server, the notification to the location-aware device.

In another embodiment, a computer system comprises a server, which is configured to receive from a location-aware device a request to identify a plurality of resources. The server is configured to receive a device identifier and location signals from the location-aware device, the location signals being associated to a current location associated with the location-aware device and received from a plurality of beacons. The server is configured to determine the current location associated with the location-aware device based at least on one of the location signals and the device identifier. The server is configured to query a database to identify the plurality of resources responsive to the request and corresponding to the current location associated with the location-aware device, wherein the database is configured to store one or more records of the plurality of resources and one or more records of a plurality of location-aware devices. The server is configured to generate a notification configured to display the plurality of resources responsive to the request. The server is further configured to transmit the notification to the location-aware device.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings. It is to be understood that both the foregoing general description and the following detailed description are exemplary and explanatory, and are intended to provide further explanation of the invention as claimed.

BRIEF DESCRIPTION OF THE DRAWINGS

The present disclosure can be better understood by referring to the following figures. The components in the figures are not necessarily to scale. The emphasis is instead placed upon illustrating the principles of the disclosure. In the figures, reference numerals designate corresponding parts throughout the different views.

DETAILED DESCRIPTION

Figure 1:
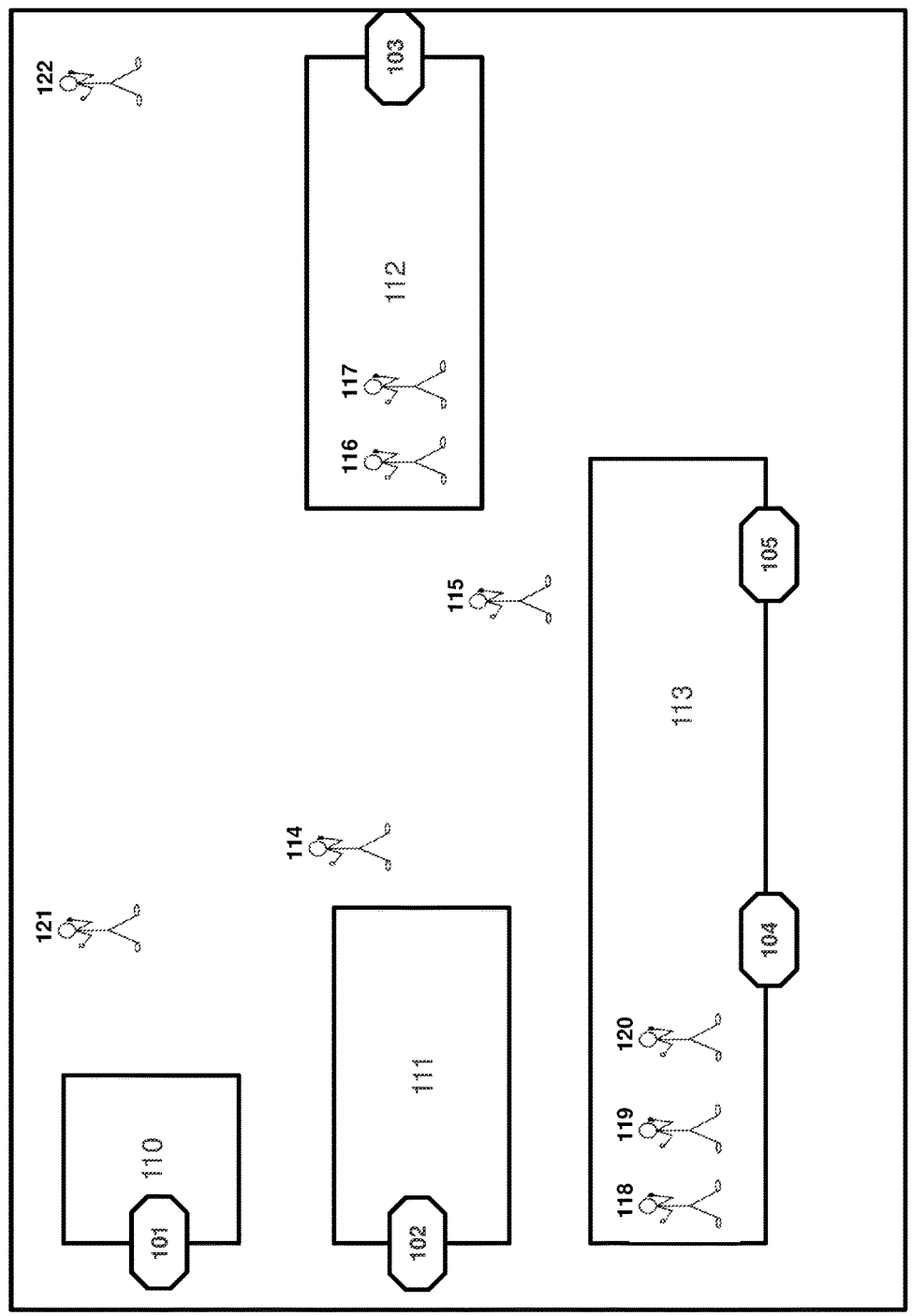
FIG. 1 illustrates an exemplary embodiment, where the beacons are associated to individual conference rooms.

Reference will now be made in detail to the preferred embodiments, examples of which are illustrated in the accompanying drawings. The embodiments described herein are intended to be exemplary. One skilled in the art recognizes that numerous alternative components and embodiments may be substituted for the particular examples described herein and still fall within the scope of the invention.

The term "beacon" as used herein refers to any device configured to transmit a data packet, which is used by a receiving device to identify the transmitting device and compute the relative distance between the transmitting device and the receiving device. Beacons can be physical devices or virtual beacons. Beacons transmit small packets of data. Currently, beacons repeatedly transmit data packets in set intervals. There are several types of beacons and associated protocols available in the market such as iBeacon system (implemented by Apple®), AltBeacon (provided by Radius Networks), and EddyStone® (from Google®). The iBeacons and AltBeacons broadcast a data packet consisting mainly of following pieces of information—a Universally Unique Identifier (UUID), a major number, a minor number, and a transmission power level known as the "Broadcasting Power." These formats require external databases to give meaning to the beacon data packets. Receiving devices can approximate distance from the beacon by comparing the Broadcasting Power to the strength of the signal as received, known as the Received Signal Strength Indicator (RSSI). As these devices typically transmit that packet over and over again, this type of transmission defines the advertising functionality of beacons. These data packets are recognized only by special apps on the mobile phone of the users. Beacons supporting the Eddystone format broadcast three different packets: a unique ID number, a URL address, and telemetrics based on sensors. They don't require an external database; instead they use web links to either link to data directly and could function via a two-way communication method. The Eddystone-URL frame type broadcasts information that can be used by a phone even without a specialized application. Virtual beacons may not require specialized devices and may use existing indoor positioning systems and the user devices to deliver location-based information. Beacons can be configured to broadcast sensor data such as temperature and battery level, or even data gathered from other sensors in the room such as motion-detectors.

The term "device identifier" as used herein refers to a distinctive combination of numbers or characters associated with a particular computing device for the purpose of uniquely identifying that computing device to other devices and systems that are communicatively coupled to it.

The term "de-identification" as used herein refers to the process of removing personal identifiers (i.e. phone numbers, names etc.) to mitigate privacy risks to individuals. Data that has gone through the de-identification process and cannot reasonably be connected or associated to a user or a specific computer or mobile device.

The term "location-aware devices" as used herein refers to computing devices that can passively or actively determine their location. Location signal data can be accessed and passed to the computing device in different ways. Location signals that can be detected by location-aware devices can be outdoor signals, indoor signals, or combinations thereof. Outdoor signals can be GPS, Wi-Fi, IP address, cell-tower triangulation, and user-reported location. Indoor signals can be A-GPS, indoor positioning system (IPS), and Wi-Fi triangulation.

The term "indoor positioning systems" as used herein refers to any system that attempts to provide an accurate position of a computing device inside of a covered structure. In addition to using location information from a beacon, certain embodiments can use triangulation to assess more accurately the location of a receiving device. For instance, the receiving device may receive signals from more than once source or of more than one type, e.g., Wi-Fi, BLE, and GPS. By relying on more than once source, the reliability and accuracy of the systems and methods disclosed herein are enhanced.

The term "micro-fenced location" as used herein refers to a virtual fenced location defined by indoor positioning systems. The boundaries of a micro-fenced location can be set by a user or by an administrator of the resource management system.

Certain embodiments of the system include a resource management server, a resource management database, a location-aware device, and a beacon. The resource management server is associated with location-aware devices. These devices may utilize a mobile application program to communicate with the resource management server, such as transmitting periodic location updates and receiving information based on location updates and queries. Exemplary embodiments of the disclosed methods include a query from a location-aware user device regarding availability of resources. This method then includes the steps of receiving by a resource management server certain location identifiers along with a device or user identifier from the location-aware user device. These location identifiers are determined based on information from beacons near the user device. In response to receipt of the identifiers from the user device, the resource management server queries a resource management database to retrieve information associated with events, people, and resources available based on the query. This information is then presented to the location-aware device through a user interface in predetermined or user-selected formats.

Exemplary embodiments of the disclosed methods include a query from an administrator of a facility regarding the utilization of the resources, such as the nature, capacity, and duration of past, current, and future events scheduled in the various rooms, the utilization of audiovisual and other equipment, the requests for beverage, food, and other support services, the requests for IT infrastructure assistance.

In an embodiment, beacons are placed in specific areas of indoor space, such as conference rooms, hallways, kitchens, offices, and other areas in a workspace. FIG. 1 is a block diagram of various components of a resource management system in accordance with an exemplary embodiment. Here, each one of the rooms 110, 111, and 112 has a beacon 101, 102, 103 associated with it, while room 113 has two beacons 104 and 105 associated with it. Each beacon can be configured such that the location signal range encompasses approximately the boundaries of the room. For example, beacon 101 associated with room 110 can have a 3 ft location signal range, beacon 102 associated with room 111 can have a 10 ft location signal range, and beacon 103 associated with room 112 can have a 20 ft. location signal range. Beacons 104 and 105 associated with room 113 can be short-range transmission beacons instead of long-range beacons, in order to avoid across-the-wall transmission issues. When a location-aware device 114 is within the location signal range of any one of the beacons, such as beacon 102 associated with room 111, then a receiver in the location-aware device 114 detects the location signals from beacon 102 and communicates them to an application program. For example, beacon 102 broadcasts the following data packet UUID 109 876 543 210 23 Major: 31 Minor: 4. The location-aware device 114 receives this data packet and determines that it is from beacon 102 situated in room 111 on a certain floor in a specific building of company X, and transmits this information along with a device identifier or a user identifier associated with the location-aware device 114 to the resource management server via the application program. The resource management server then queries (e.g., send a request) an associated resource management database to retrieve information associated with events, people, and resources available at room 111. This information is then presented back to the user of the location-aware device 114. The resource management server may receive the request, and query the database for an answer. For example, the request received may inquire about the schedule of a conference room and the resource management server may determine the identity of the user associated with the location-aware device, then query the database for a schedule associated with the conference room, and upon determine that there is vacancy, transmit a notification to the location-aware device 114 that the conference room is available. In another example, the information presented back to the location-aware device 114 can be room 111 is available until noon, can seat 6 people, and has no audiovisual equipment. The resource management server may generate a notification configured to display the information (e.g., response to the request by the user associated with the location-aware device 114) and transmit the notification to the location-aware device 114. The notification can also be configured to present options to the user, such as options to reserve room 111 until noon, invite other employees to join the user at room 111, request audiovisual equipment for room 111, or indicate the need for additional assistance like a food or beverage service, transcription services, or IT help.

As another example, when a location-aware device 115 is within the location signal range of any one of the beacons, such as beacon 103 associated with room 112 and beacon 105 associated with room 113, then a receiver in the location-aware device 115 detects the location information (e.g., signals received from beacons 103 and 105) and communicates them to an application program. For example, beacon 103 broadcasts the following data packet UUID 129 866 553 220 23 Major: 30 Minor: 6, while beacon 105 broadcasts the following data packet UUID 199 866 533 200 22 Major: 35 Minor: 8. The location-aware device 115 receives these two data packets and determines that they are from beacons 103 and 105 situated in room 112 and 113 on a certain floor in a specific building of company X, and transmits this information along with a device identifier or a user identifier associated with the location-aware device 115 to the resource management server via the application program. The resource management server then queries an associated resource management database to retrieve information associated with events, people, and resources available at rooms 112 and 113. The resource management server may generate and transmit a notification configured to display/present the results. For example, the notification transmitted to the location-aware device 115 can include the details of meetings in rooms 112 and 113 such as duration, content, private or public nature of the meetings. The notification transmitted to the location-aware device 115 can also present details like names, titles, and departments associated with users of devices 116 and 117, then also present options to the user, such as options to join the meeting in room 112, invite other employees to join the users at room 112, or view the presentations designated for viewing in room 112. With regards to room 113, users 118, 119, and 120, or an administrator can designate their meeting as private, so following the query from the resource management server, no details regarding the meeting in room 113 are provided to the location-aware device 115, except the unavailability of the room 113.

As another example, a resource management program supported by the resource management server can query the associated resource management database on a periodic basis to determine if there are any beacons whose signals are not picked up by any location-aware devices. In that instance, the room associated with that beacon can be made available on a shared calendar for the users, such as employees of Company X. As shown in FIG. 1, after the user of location-aware device 121 leaves room 110, there will be no device transmitting the signals received from beacon 101. The resource management program can respond to this lack of any device transmitting signals from beacon 101 or lack of appropriate location signal transmissions from location-aware device 121, by providing instructions to an electrical control system to turn off the lights and audiovisual equipment associated with room 110, or also provide notifications to a support team to clean or prepare the room for another meeting.

FIG. 1 also illustrates another exemplary embodiment, where a user accesses the resource management server using his device 122 and submits a request for an empty conference room. The resource management server then presents the results of the query on an electronic graphical user interface on the device 122, such as the time duration of availability of rooms 110 and 111, maximum occupancy, and other resources such as audiovisual equipment, IT infrastructure, and tools associated with the rooms. The user can also request view of status of all the conference rooms on the floor, meetings available for public attendance, and other information associated to the resources in any format or combination as required.

Figure 2:
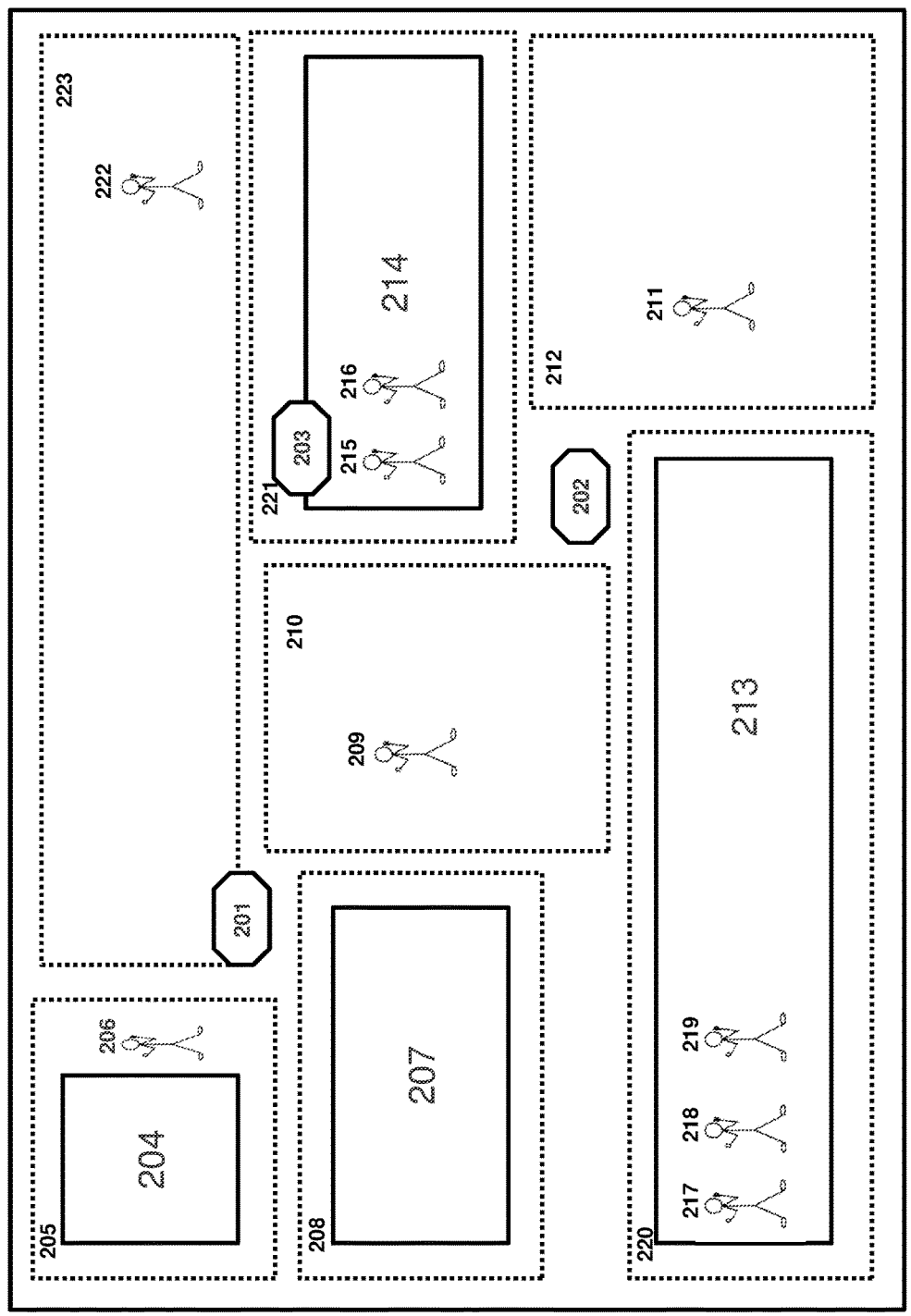
FIG. 2 illustrates an exemplary embodiment, where the beacons are utilized to generate micro-fenced locations.

FIG. 2 is a block diagram of various components of a resource management system in accordance with another exemplary embodiment. Here, the beacons 201, 202, and 203 are placed in specific areas of indoor space, such as conference rooms, hallways, kitchens, offices, and other areas in a workspace, but the beacons are not associated with each of the rooms 210, 211, 212, and 213. Instead, information associated to a diagrammatic representation of the physical floor plan is provided to the resource management database. A dataset containing strength and composition of the location signals from various beacons throughout the entire floor is created and overlaid on the diagrammatic representation of the physical floor plan. Thus, granular portions of the physical floor plan are associated to strength and composition of the location signals from various beacons to create several micro-fenced locations. In this embodiment, individual beacons need not be moved regularly due to floor plan changes or in companies that have flexible, adaptable workspaces. When there is change in the physical floor plan, then a simple upload of the diagrammatic representation of the floor plan will be sufficient to recalibrate the resource management program to adapt to the new floor plan and create new micro-fenced locations. Using beacons as shown in FIG. 2 results in a dynamic resource availability map with virtual fenced locations. In an embodiment, maps of physical resources, such as conference rooms, hallways, kitchens, offices, and other areas in a workspace, can also be mapped as micro-fenced locations. At a given point, a mobile application on a user device may detect different location signals with certain signal strengths. This set of location signals and their associated signal strengths represents a data point that is unique to that physical position. In other embodiments, the users can request the desired resources, navigate the hallways to the physical locations, and participate in events with the use of their devices.

For example, as illustrated in FIG. 2, a limited dataset containing strength and composition of the location signals from the beacons 201, 202, and 203, and corresponding to the room 204 defines the micro-fenced location 205. When a location-aware device 206 is outside the room 204, the receiver in the location-aware device 206 detects the location signals from the three beacons 201, 202, and 203. The device 206 communicates them along with a device identifier or a user identifier associated with the location-aware device 114 to the resource management server via an application program. The unique combination of strength and composition of the location signals from device 206 is used to determine that the device is within the micro-fenced location 205. The resource management server then queries an associated resource management database to retrieve information associated with events, people, and resources available at the micro-fenced location 205. This information is then presented back to the user of the location-aware device 206. For example, the information presented back to the location-aware device 206 can be room 204 is available until noon, can seat 6 people, and has no audiovisual equipment. The resource management server may generate and transmit a notification configured to display/present the results. For example, the notification transmitted to the location-aware device 115 may be configured to present options to the user, such as options to reserve room 204 until noon, invite other employees to join the user at room 204, request audiovisual equipment for room 204, or indicate the need for additional assistance like a food or beverage service, transcription services, or IT help.

Similarly, in FIG. 2, the physical room 207 can correspond to micro-fenced location 208. The resource management program supported by the resource management server can query the associated resource management database on a periodic basis to determine if there are any micro-fenced locations whose corresponding datasets are not transmitted by any location-aware devices. In that instance, the room associated with that micro-fenced location can be made available on a shared calendar for the users, such as employees of Company X. As shown in FIG. 2, after the user of location-aware device 209 leaves room 207, there will be no device transmitting location signal datasets corresponding to the micro-fenced location 208. The resource management program can respond to this lack of any device transmitting location signal datasets corresponding to the micro-fenced location 208 or the reception of location signal datasets corresponding to the micro-fenced location 210 from location-aware device 209, by providing instructions to an electrical control system to turn off the lights and audiovisual equipment associated with room 207, or also provide notifications to a support team to clean or prepare the room for another meeting, or send a feedback request or other follow-up notification to location-aware device 209.

As another example, when a location-aware device 211 is in the micro-fenced location 212, then a receiver in the location-aware device 211 detects the location signals from the three beacons 201, 202, and 203. The device 211 communicates them along with a device identifier or a user identifier associated with the location-aware device 211 to the resource management server via an application program. The unique combination of strength and composition of the location signals from device 211 is used (by the resource management server) to determine that the device is within the micro-fenced location 212. The resource management server then queries an associated resource management database to retrieve information associated with events, people, and resources available at the micro-fenced location 212. This information is then presented back to the user of the location-aware device 211. For example, the information presented back to the location-aware device 211 can include the details of meetings in rooms 213 and 214 such as duration, content, private or public nature of the meetings. The notification transmitted to the location-aware device 211 can also be configured to present details like names, titles, and departments associated with users of devices 215 and 216, then also present options to the user, such as options to join the meeting in room 214, invite other employees to join the users at room 214, or view the presentations designated for viewing in room 214. With regards to room 213, users 217, 218, and 219, or an administrator can designate their meeting as private, so following the query from the resource management server, no details regarding the meeting in room 213 are provided to the location-aware device 211, except the unavailability of the room 213. The rooms 213 and 214 can be described in the resource management server as the physical locations encompassed by micro-fenced locations 220 and 221 respectively.

FIG. 2 also illustrates another exemplary embodiment, where a user accesses the resource management server using his device 222 and submits a request for an empty conference room. The resource management server then presents the results of the query on an electronic interface on the device 222, such as the time duration of availability of rooms 204 and 207, maximum occupancy, and other resources such as audiovisual equipment, IT infrastructure, and tools associated with the rooms. The user can also request view of status of all the conference rooms on the floor, meetings available for public attendance, and other information associated to the resources in any format or combination as required. In other instances, transmission of locations signals corresponding to micro-fenced locations 223 and 212 to the resource management server can result in the user interfaces on devices 222 and 211 being configured to present a variety of other options, such as an option to access a map showing the location of the various rooms and the route to get to the desired room.

Figure 3:
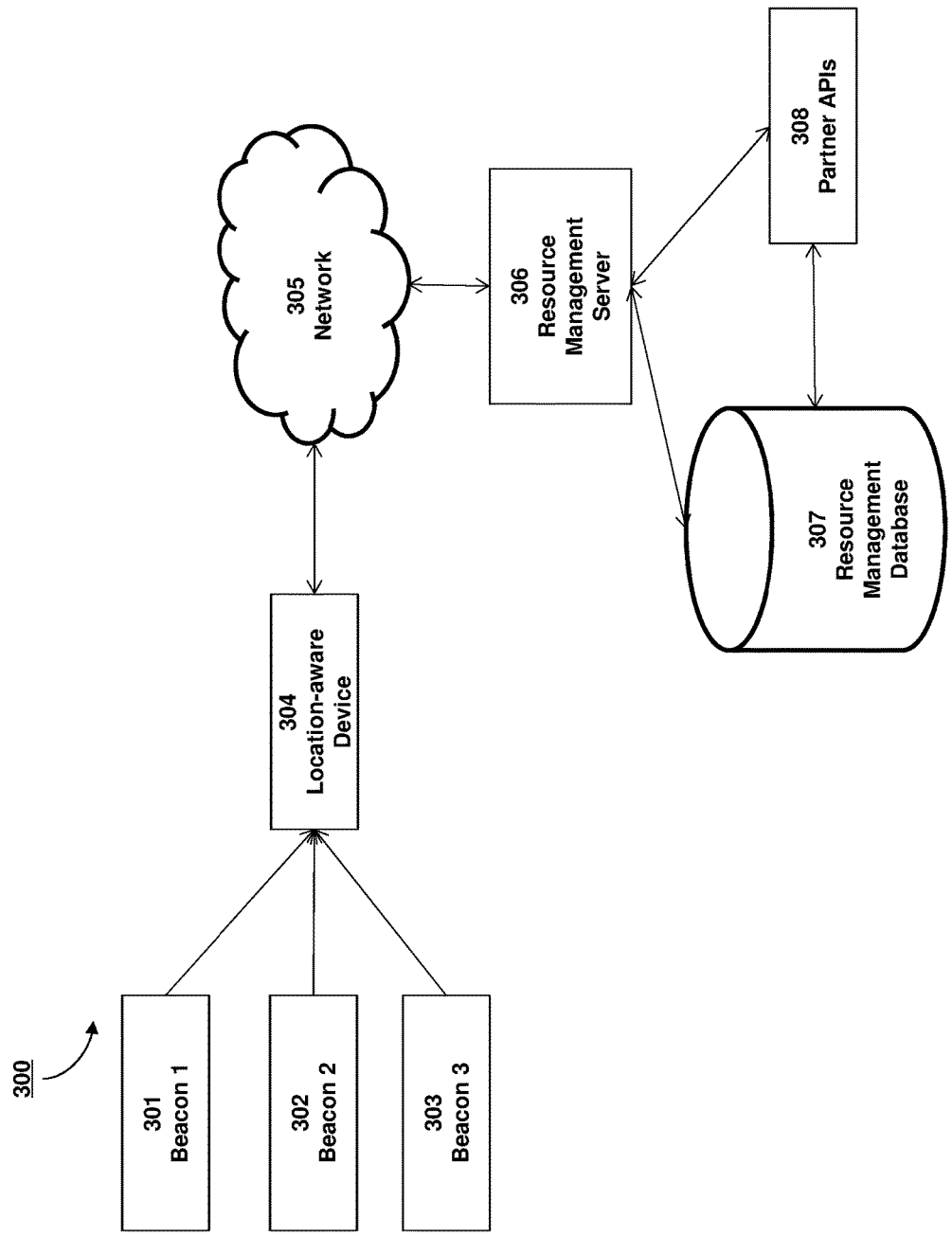
FIG. 3 is a block diagram illustrating a system containing a resource management server, according to an embodiment.

Certain embodiments include a system for communicating information from a resource management database to a location-aware device. FIG. 3 is a block diagram illustrating a system 300 containing a resource management server, according to an embodiment. A plurality of beacons 301, 302, and 303 transmit a plurality of location signals that are received by a location-aware device 304. The device 304 then transmits a device identifier and the plurality of location signals from the plurality of beacons 301, 302, and 303 via a network 305 to one or more servers constituting the resource management server 306. The system includes a resource management database 307 hosted by or communicatively coupled to the resource management server 306. The resource management database 307 is configured to store one or more records of one or more resources, one or more records of one or more location-aware devices, and combinations thereof.

The location-aware device 304 can be any mobile computing devices, e.g., smartphone or tablets, which can receive a wireless signal from one or more transmitters of location signals. When the location-aware device 304 receives the location signals, it can process it using one or more mobile applications in communication with one or more servers constituting the resource management server 306. Mobile applications of the resource management system can be implemented as software that can be downloaded and installed on the location-aware device 304. Examples of mobile application are GUI applications that may be available at, downloaded, and installed from a public software app stores or digital application distribution platforms, such as Apple iTunes®, Google Play® Store and Amazon.Com®, among others. In these embodiments, mobile application includes the following exemplary functions: allowing the user to create and manage a user account within the resource management system 300; allowing the user to see the available resources associated with particular physical locations or micro-fenced locations, allowing the user to receive communications such as calendar notifications, e-mails or text messages from the resource management system 300; and allowing the user to see updates or modifications or other status reports or options for further action and instructions from the resource management system 300.

The mobile application can have a landing graphical user interface or an introductory interface where the user is enters his credentials to the resource management system 300. Upon entering proper credentials, the user is presented (by the resource management server 300) with graphical user interfaces that present, collect, and communicate information to and from the resource management system 300. One or more user-side and server-side technologies or combinations thereof can be implemented to ensure that the graphical user interfaces are dynamically generated based on the updates to the records in the resource management database 307. Content for personalized web-based or an app-based interfaces can be dynamically generated on user devices, based on updates to the resource management database 307 and plurality of inputs from the location aware devices. The information presented to the location-aware devices can be subject to de-identification, depending on the security levels or the "need-to-know" level associated with various users of the resource management system 300. Data communicated between the various devices, servers, and other components of the system is encrypted, stored, decrypted, and distributed using one or more firewalls, antivirus and ant phishing software, file encryption protocols, and other encryption software.

In some embodiments, the UUIDs or unique identifiers of the beacons 301, 302, and 303 must be programmed and associated with particular locations where they are installed. The beacons 301, 302, and 303 continuously broadcast information, for example in the form of data strings, at a pre-determined interval, like a heartbeat of data broadcasts, which are then captured by one or more applications on the location-aware devices. The data fields in these broadcasted data strings could include an identifier of an individual beacon, location of the beacon in the office space, time of day, and any information designed for consumption by the location-aware devices.

A resource management server 306 may be any computing device, including one or more servers, comprising non-transitory machine-readable storage media, processors, and software modules capable of performing various tasks and processes described herein. In an embodiment, an application can be downloaded to a location-aware device that is able to communicate with the server. The application can be created and maintained by same party who maintains the resource management server 306. In certain embodiments, component features of the server may reside on separate physical devices.

The resource management database 307 is a body of information associated with the resources in the workspace or facility or company, and organized as records. This database can comprise information regarding individual resources such as available user devices, presentations from a particular user device, user preferences for resources, and shared resources such as rooms, equipment, and available personnel, online calendars. Information in these databases can be stored or retrieved dynamically using appropriate storage management software. For example, a database in some embodiments can be a database containing information regarding the beacons 301, 302, and 303, their locations, online calendars associated to them, or any information for the user. The database can be part of the server, however, in some embodiments the database may reside on a different computing device than the server (i.e., a distributed computing environment).

The system includes a network, which is any common communication architecture that facilitates communication between computing devices. For example, the computing devices communicating over the network would be the one or more receiving devices, one or more beacons 301, 302, and 303, a network server, and one or more databases. One having ordinary skill in the art would appreciate that the network may be the Internet, a private intranet, or some hybrid of the two. The network may be comprised of any combination of devices and protocols capable of facilitating communication between computing devices. Non-limiting examples of devices comprising the network may include routers, switches, hubs, firewalls, proxy servers, telecommunications trunks, and the like. Non-limiting examples of protocols employed by the network may include TCP/IP, Wi-Fi, Bluetooth®, 3G, Wi-Max, and the like. Wireless communication between one or more location-aware devices and one or more transmitters may be performed with a relatively short-range wireless communication protocol such as Wi-Fi, Bluetooth, high frequency systems, or other relatively localized wireless communication protocols.

Beacons 301, 302, and 303 may be any computing or other electronic device comprising a processor and a wireless interface capable of transmitting signals to a receiving device. The signals may contain binary data, and the binary data may represent various types of data and/or information for the location-aware device 304 to consume and implement. The components of the location-aware device 304 receiving the signals, may translate the signals into useful binary data triggering various tasks and process according to the application executed by the location-aware device 304. The beacons 301, 302, and 303 may implement any suitable components for wirelessly communicating with the location-aware device 304, or other receivers. The technological components may include wireless networking hardware and the related protocols, such as a Bluetooth low energy (BLE) interface chip and the Bluetooth wireless communication protocols.

Although FIG. 3 shows only a limited number of beacons 301, 302, and 303, it should be appreciated that more transmitters may be communicatively coupled to one another, over a wired and/or wireless network of transmitters. That is, locations, such as brick-and-mortar office buildings, schools, campuses of multiple buildings, governmental or administrative buildings, and the like, may implement localized networks of beacons to transmit and/or collect data, across a broader area. Furthermore, although the exemplary system described in FIG. 3 describes stationary beacons 301, 302, and 303, it should also be appreciated that beacons 301, 302, and 303 may be any suitable stationary or mobile devices that are capable of performing the various tasks and processes described herein. Thus, a collection of beacons 301, 302, and 303 can comprise a combination of mobile and stationary devices. It should also be appreciated that, although FIG. 3 describes beacons 301, 302, and 303 performing one-way signal transmissions, beacons 301, 302, and 303 may be capable of two-way communications (i.e., collecting data from signals transmitted by receiving devices), and may be capable of a number of functions or execute a variety of software modules. Non-limiting examples of beacons 301, 302, and 303 may include an iBeacon, AltBeacon, and EddyStone, a wireless router, a cellular phone, a tablet, a workstation, or any other suitable computing or other electronic device. The data strings from the beacon can comprise both constant identifiers that do not change with every broadcast and dynamic identifiers that change with every broadcast.

The plurality of records can be provided by a partner application programmable interfaces (API) 308 associated to the resource management server 306 configured to process resource records associated with one or more facilities or workspaces. The APIs 308 can be any Representational State Transfer Application Programming Interface (REST API) that controls and manages one or more APIs. In these embodiments, API provides web services to one or more mobile applications installed on the computing devices. Examples of web services include showing data on a website, uploading large amounts of data that will later be consumed by a mobile app, downloading data to run custom analytics, exporting data, and the like. APIs are commonly a collection of one or more computing protocols and/or routines that indicate a software program's or software service's functions, and each function's requisite inputs. The APIs may be used to query and fetch data from databases, or pass information to other services or programs. For example, APIs may be used to communicate information and instructions to cloud-based services regarding the resources associated with particular micro-fenced locations. APIs may be used to facilitate communications between a plurality of servers underlying web-based or network-based services used by the users to monitor, access, or manage resources.

Embodiments of the invention present several advantages over existing systems. The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. The invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein. While various aspects and embodiments have been disclosed, other aspects and embodiments are contemplated. The various aspects and embodiments disclosed are for purposes of illustration and are not intended to be limiting, with the true scope and spirit being indicated by the following claims.

The invention claimed is:

1. A server-implemented method comprising:
    periodically determining, by a server, an availability status associated with each of a plurality of resources in response to receiving location signals from at least one beacon located within each of the plurality of resources, whereby when the server does not receive any location signals associated with a resource, the server determines that resource to be available;
    receiving, by the server, from a location-aware device operated by a user, a request to identify availability status of at least one resource of the plurality of resources, wherein the request comprises a device identifier associated with the location-aware device and at least one location signal detected by the location-aware device from the at least one beacon of the at least one resource;
    determining, by the server, a current location of the location-aware device based on the device identifier;
    determining, by the server, a location of the at least one resource based on a signal strength and a composition comprising a unique identifier of the at least one location signal emitted from the at least one beacon of the at least one resource;
    querying, by the server, the database to determine the availability status of the at least one resource corresponding to the current location associated with the location-aware device based on information associated with the at least one location signal;
    displaying, by the server, the availability status of the at least one resource, and a map showing a route between the current location of the location-aware device and the location of the at least one resource responsive to the request on the location-aware device;
    monitoring, by the server, a presence of the user in the at least one resource based on processing of signals transmitted from the location-aware device of the user; and
    when the server determines that the location-aware device has moved out of the at least one resource, transmitting, by the server, instructions to an electrical control system to turn off equipment in the at least one resource.

2. The server-implemented method of claim 1, further comprising determining, by the server, the location data associated with each of the plurality of resources based at least in part from the one or more location signals from the at least one beacon located within each of the plurality of resources.

3. The server-implemented method of claim 1, wherein the location-aware device is configured to detect the at least one location signal from the at least one beacon of the at least one resource when the location-aware device is within a location signal range of the at least one resource.

4. The server-implemented method of claim 1, wherein the plurality of resources comprises a plurality of conference rooms.

5. The server-implemented method of claim 4, wherein the plurality of resources further comprises a conflict schedule associated with the conference room.

6. The server-implemented method of claim 4, wherein the request to identify one or more of a plurality of resources comprises a request to identify a current availability of one of the plurality of conference rooms.

7. The server-implemented method of claim 4, wherein the request to identify one or more of a plurality of resources comprises a request to identify a future availability of one of the plurality of conference rooms.

8. The server-implemented method of claim 4, wherein the plurality of resources further comprises audiovisual equipment associated with the conference room.

9. The server-implemented method of claim 4, wherein the plurality of resources further comprises a maximum occupancy associated with the conference room.

10. The server-implemented method of claim 1, wherein the notification is further configured to display a map associated with the at least one resource responsive to the request, and wherein the notification is further configured to display a route towards the at least one resource responsive to the request.

11. A computer system comprising:
    a plurality of beacons where each beacon emits location information;
    a location-aware device operated by a user;
    a server communicatively coupled to the plurality of beacons and the location-aware device, wherein the server is programmed to execute instructions to:
        periodically determine an availability status associated with each of a plurality of resources in response to receiving one or more location signals from at least one beacon located within each of the plurality of resources, whereby when the server does not receive any location signals associated with a resource, the server determines that resource to be available;
        receive from the location-aware device, a request to identify availability status of at least one resource of the plurality of resources, wherein the request comprises a device identifier associated with the location-aware device and at least one location signal detected by the location-aware device from the at least one beacon of the at least one resource;
        determine a current location of the location-aware device based on the device identifier;
        determine a location of the at least one resource based on a signal strength and a composition comprising a unique identifier of the at least one location signal emitted from the at least one beacon of the at least one resource;
        query the database to determine the availability status of the at least one resource corresponding to the current location associated with the location-aware device based on information associated with the at least one location signal;
        display the availability status of the at least one resource, and a map showing a route between the current location of the location-aware device and the location of the at least one resource responsive to the request on the location-aware device;
        monitor a presence of the user in the at least one resource based on processing of signals transmitted from the location-aware device of the user; and when the server determines that the location-aware device has moved out of the at least one resource, transmit instructions to an electrical control system to turn off equipment in the at least one resource.

12. The computer system of claim 11, the server is further programmed to execute instructions to determine the location data associated with each of the plurality of resources based at least in part from the one or more location signals from the at least one beacon located within each of the plurality of resources.

13. The computer system of claim 11, wherein the location-aware device is configured to detect the at least one location signal from the at least one beacon of the at least one resource when the location-aware device is within a location signal range of the at least one resource.

14. The computer system of claim 11, wherein the plurality of resources comprises a plurality of conference rooms.

15. The computer system of claim 14, wherein the plurality of resources further comprises a conflict schedule associated with the conference room.

16. The computer system of claim 14, wherein the request to identify one or more of a plurality of resources comprises a request to identify a current availability of one of the plurality of conference rooms.

17. The computer system of claim 14, wherein the request to identify one or more of a plurality of resources comprises a request to identify a future availability of one of the plurality of conference rooms.

18. The computer system of claim 14, wherein the plurality of resources further comprises audiovisual equipment associated with the conference room.

19. The computer system of claim 14, wherein the plurality of resources further comprises a maximum occupancy associated with the conference room.

20. The computer system of claim 11, wherein the notification is further configured to display a map associated with the at least one resource responsive to the request, and wherein the notification is further configured to display a route towards the at least one resource responsive to the request.

* * * * *